June 14, 1966  E. B. BORNHOLT  3,255,544
FASTENER
Filed March 29, 1963

INVENTOR.
E. BRUCE BORNHOLT
BY
Charles J. Penfold
ATTORNEY

United States Patent Office 3,255,544
Patented June 14, 1966

3,255,544
FASTENER
Edward Bruce Bornholt, 20 Washington St.,
Valparaiso, Ind.
Filed Mar. 29, 1963, Ser. No. 268,978
2 Claims. (Cl. 40—156)

The subject invention relates generally to fastening means and more particularly is directed to a fastener which is adapted for use in securing a picture or one or more members to a frame.

It is recognized that various devices or fasteners have heretofore been employed for the above purpose. For example, some are comprised of several jointed parts; some are spring urged, while others are cumbersome, flimsy or difficult to install.

With the foregoing in mind the principal objects of the invention are to provide a fastener which not only overcomes the disadvantages inherent in those of the character above referred to, but possesses attributes with respect to simplicity in design and construction, efficiency, ease of installation, and production.

More particularly, an important object of the invention is to provide a fastener which is so designed and constructed that it can be readily reversibly mounted at least in either of two operative positions in order to facilitate holding one or more members in various relations with respect to different forms of frames.

A specific object of the invention is to provide a fastener preferably comprising an elongated narrow planar body or strip having extremities which are provided with offset formations whereby the fastener can be connected to a frame in either of the two positions above referred to.

A significant object of the invention is to provide a fastener which also serves as a brace whereby to assist in reinforcing a frame.

Additional objects and attributes of the invention will become apparent after the description hereinafter set forth is considered in conjunction with the drawings annexed hereto.

Figure 3:
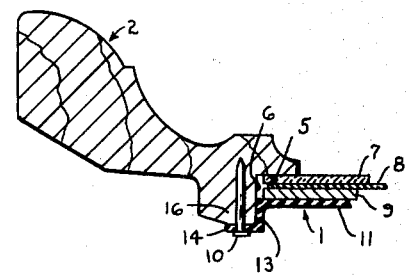
FIGURE 3 is a transverse section taken substantially on line 3—3 of FIGURE 2, depicting details of the structure.
Figure 5:
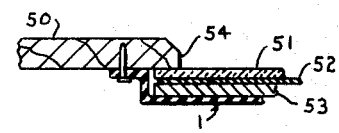
Figure 4:
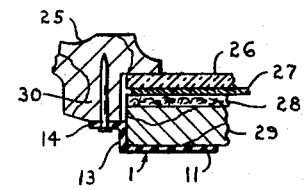

FIGURE 4 is a partial section of a recessed frame showing a fastener connected thereto in a position reverse from that in FIGURE 3, securing a plurality of members, with at least one of the members being partially disposed in the recess and externally thereof; and FIGURE 5 is a partial section of a frame showing a fastener connecting a plurality of members against a rear side of an unrecessed frame.

Figure 1:
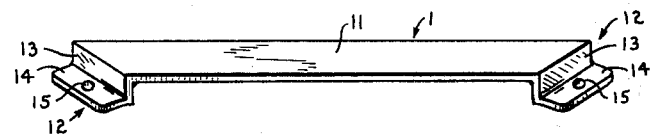
FIGURE 1 is a front elevational view of a fastener embodying the invention.
Figure 2:
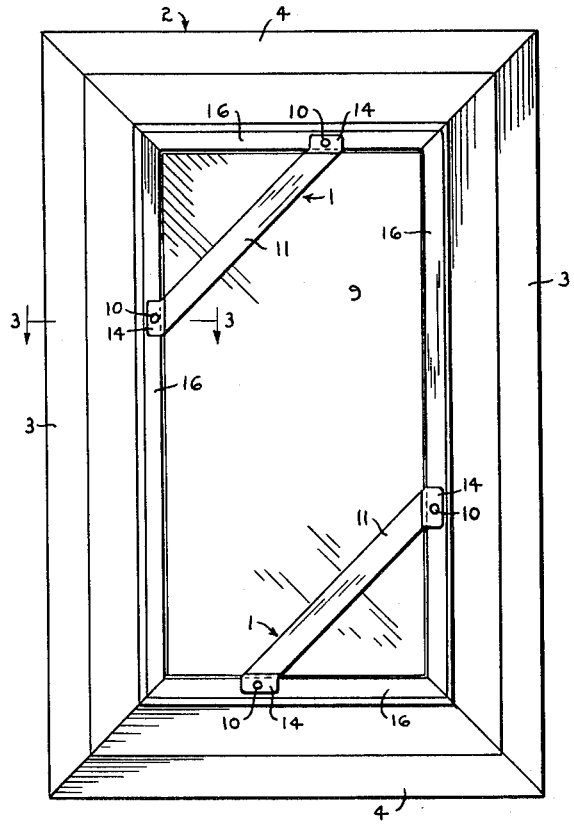
FIGURE 2 is a rear elevational view of a frame illustrating a pair of fasteners serving to hold a mounting, picture and glass in a recess provided in a rear side of the frame.

Referring first and more particularly to FIGURES 1, 2 and 3 of the drawings, numeral 1 generally designates a fastener and 2 designates a conventional rectangular frame of an ornamental type comprised of a pair of elongate vertical mouldings 3 and a pair of horizontal mouldings 4 which are joined in any manner desired. The rear side of the frame, or more specifically the inner portions of the mouldings, are usually rabbeted to provide a recess defined by right angled surfaces 5 and 6.

As best illustrated in FIGURES 2 and 3, a plurality of members, such as a pane of glass 7, a sheet 8 provided with a picture or other media, and a backing 9 are successively arranged in a superimposed relation in the recess and held therein by a pair of the fasteners connected to the frame by brads or screws 10. Attention is directed to the fact that although only two fasteners may be required for disposition in a parallel relation at diagonally disposed corners of smaller frames, such as the frame shown in FIGURE 2, four fasteners will be needed for the majority of frames. It will be observed that portions of the fasteners are adpated for disposition in the recess when the fasteners are mounted or connected to a frame in one of its positions as alluded to above.

The fasteners may be designed and constructed in various ways and made of any material suitable for the purpose. The fastener shown is preferably moulded from a plastic and comprises an elongate narrow body or strip portion 11 of uniform thickness and extremities which are provided with offset formations generally designated 12. Each of the pair of formations, whether termed extremities, ends, or offsets, preferably includes a relatively short planar leg or portion 13 and a planar foot or portion 14 provided with an aperture or hole 15. The legs are disposed perpendicular to the plane of the body and at oblique angles of 45 degrees with reference to its longitudinal axis and the feet are disposed perpendicularly outward from the legs in a plane parallel to the body. It will be noted that the feet are relatively narrow in width and that the apertures 15 are centered and so positioned with reference to the legs that when a fastener is correctly placed on the frame with the feet bearing on portions 16 thereof as shown in FIGURES 2 and 3, the apertures will be properly located for driving the brads therethrough into the frame.

The fasteners as mentioned above are so constructed that they can be readily mounted in either of two positions and to install them in the position as illustrated in FIGURES 2 and 3 they are manipulated to place their body portions 11 on the backing 9 and then moved diagonally into the appropriate corners of the frame where the legs 13 will more or less automatically adjust themselves against the margins 6 of the recess and thereby locate the fasteners in a hypotenuse relation to the corners. The height of the legs is preferably predetermined and the overall thickness of the members in the recess is such that when the fasteners are connected to the frame by the brads, the body portions of the fasteners may apply a light pressure to the members whereby to assist in holding them against displacement. It will be noted that the body portions and legs are disposed in the recess and that the foot portions overlie the frame portions 16 and extend longitudinally therewith. The fastener shown in the upper left hand corner of FIGURE 2 also serves as a brace whereby to assist in reinforcing the mouldings 3 and 4 to which the fastener is connected and the fastener in the lower right hand corner of the frame serves to reinforce the mouldings to which it is connected. The factor of bracing or reinforcement is particularly important, when, for example, the frame members are quite small in cross-section.

The fasteners may also be attached to a frame 25 in a reverse position as evidenced in FIGURE 4. In this illustration the frame is provided with a recess in which is received a plurality of members, such as a pane of glass 26, a picture 27, backing 28, and a spacer 29, the latter of which partially projects outside the recess. The fasteners are installed by placing their body portions 11 diagonally on the corners of the spacer 29 and then moving them inwardly so that their legs 13 will engage the marginal edges of the spacer and the feet on a portion 30 of the frame so that brads can be readily driven through the apertures in the feet and into the frame. It is to be understood that the thickness of the backing and spacer may be varied depending on the thickness of the glass and the picture. If desired, a greater number of members like the backing and spacer may be employed or the backing and spacer can be made in one-piece.

As exemplified in FIGURE 5 of the drawing, there is shown a frame 50 with a plurality of members, such as a pane of glass 51 engaging a rear planar surface of the frame, a picture 52 and backing 53, with fasteners for holding the members assembled and in relation to the frame. It will be observed that the body portion of the fastener shown bears against the backing 53 and that the leg portion is disposed in relation to the marginal edges of the members and serves as an abutment for locating as well as assist in holding the members in a predetermined position with respect to a sight opening 54 in the frame. It is, of course, apparent that the frames 2 and 25 above referred to are also provided with sight openings and that their recesses are adjacent thereto. The foot portion of the fastener is anchored to the frame by brads. Eight (8) brads of ⅜" length and eight (8) brads of ¾" length are to be included in each set of four (4) fasteners. These two sizes should be sufficient to take care of the greater majority of applications. In very rare instances larger brads may be needed. Brads of different lengths may be utilized, depending on the structure of the frame and the members adapted for association therewith.

Having thus described my invention it is to be understood that various modifications of the invention may be utilized without departing from the spirit of the invention, hence I do not wish to be limited to the exact forms, constructions or arrangements herein illustrated and described.

I claim:

1. A rigid one-piece fastener of the kind adapted for diagonal use at the corner of a rectilinear frame, said fastener comprising an elongate planar body portion provided with formations, said formations being provided with planar portions which are offset from said body portion and define portions of a right angle, said offset portions being respectively provided with lateral portions disposed in the same plane and parallel to the plane of said body portion, said lateral portions being provided with means whereby to facilitate attachment of the fastener to a frame, and said formations affording an arrangement whereby the complete fastener may be attached to a frame for disposition externally of an opening therein or in a reverse position in which its body portion and offset portions may be disposed within the confines of a recess in a frame.

2. The fastener defined in claim 1, in which the lateral portions are respectively provided with openings through which means may be reversely extended to attach the fastener to a frame.

References Cited by the Examiner

UNITED STATES PATENTS

| | | | |
|---|---|---|---|
| 565,818 | 8/1896 | Ward. | |
| 700,256 | 5/1902 | Tapscott | 40—156 |
| 893,392 | 7/1908 | Sincock. | |
| 1,857,966 | 5/1932 | Long | 40—156 |
| 2,489,477 | 11/1949 | Brecher | 40—156 |

FOREIGN PATENTS 19,382  9/1908  Great Britain.

EUGENE R. CAPOZIO, *Primary Examiner.*

JEROME SCHNALL, *Examiner.*

WENCESLAO J. CONTRERAS, *Assistant Examiner.*